(12) United States Patent
Livshitz et al.

(10) Patent No.: US 8,737,006 B2
(45) Date of Patent: May 27, 2014

(54) STORAGE DEVICE HAVING DEGAUSS CIRCUITRY GENERATING DEGAUSS SIGNAL WITH MULTIPLE DECAY SEGMENTS

(75) Inventors: Boris Livshitz, Eagan, MN (US); Paul Mazur, Cottage Grove, MN (US); Anamul Hoque, Lakeville, MN (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/606,279

(22) Filed: Sep. 7, 2012

(65) Prior Publication Data

US 2014/0071561 A1   Mar. 13, 2014

(51) Int. Cl.
*G11B 5/012* (2006.01)

(52) U.S. Cl.
USPC .......................................... 360/66

(58) Field of Classification Search
None
See application file for complete search history.

(56) References Cited

U.S. PATENT DOCUMENTS

| | | | |
|---|---|---|---|
| 4,607,310 A | 8/1986 | Channel et al. | |
| 4,970,621 A * | 11/1990 | Gailbreath et al. | 361/149 |
| 6,351,340 B2 * | 2/2002 | Dixon | 360/66 |
| 7,092,186 B1 | 8/2006 | Hogg | |
| 7,372,653 B2 | 5/2008 | Suzuki et al. | |
| 7,411,756 B2 | 8/2008 | Wilson et al. | |
| 7,450,328 B2 * | 11/2008 | Yang | 360/66 |
| 7,515,371 B1 | 4/2009 | Buch et al. | |
| 7,787,211 B2 | 8/2010 | Kim et al. | |
| 7,813,068 B2 | 10/2010 | Takeuchi | |
| 7,872,825 B2 | 1/2011 | Sanghvi | |
| 2005/0190476 A1 | 9/2005 | Wilson et al. | |
| 2005/0243457 A1 | 11/2005 | Akamatsu et al. | |
| 2006/0139787 A1 | 6/2006 | Ohinata et al. | |
| 2006/0176597 A1 | 8/2006 | Ngo et al. | |
| 2007/0153410 A1 | 7/2007 | Hashizume et al. | |
| 2008/0316669 A1 | 12/2008 | May | |

OTHER PUBLICATIONS

M.S. Patwari et al., "Simulation of Erase After Write on 2.4T FeCo Solid Pole Writer," IEEE Transactions on Magnetics, May 2010, pp. 1212-1219, vol. 46, No. 5.
M.E. Schabes et al., "Dynamic Micromagnetic Studies of Anisotropy Effects in Perpendicular Write Heads," IEEE Transactions on Magnetics, Oct. 2005, pp. 3073-3075, vol. 41, No. 10.
D.Z. Bai et al., "Degaussing PMR Writer Poles: A Micromagnetic Modeling Study," IEEE Transactions on Magnetics, Oct. 2011, pp. 3407-3410, vol. 47, No. 10.

(Continued)

*Primary Examiner* — K. Wong
(74) *Attorney, Agent, or Firm* — Ryan, Mason & Lewis, LLP

(57) ABSTRACT

A hard disk drive or other disk-based storage device comprises a storage disk, a write head configured to write data to the disk, and control circuitry coupled to the write head. The control circuitry comprises a write driver and degauss circuitry associated with the write driver. The degauss circuitry is configured to generate a degauss signal to be applied to the write head by the write driver. The degauss signal has a waveform comprising a plurality of decay segments including at least one alternating current decay segment and at least one direct current decay segment. An initial decay segment of the plurality of decay segments may comprise an alternating current decay segment or a direct current decay segment, and may be immediately followed by a decay segment of the opposite type.

20 Claims, 7 Drawing Sheets

(56) References Cited

OTHER PUBLICATIONS

J.J. Kim et al., "Magnetic Domain Observation in Writer Pole Tip for Perpendicular Recording Head by Electron Holography," Applied Physics Letters, Magnetism and Superconductivity, Apr. 2008, 3 pages, vol. 92, No. 16.

B. Livshitz et al., "Degaussing of Write Heads in Perpendicular Magnetic Recording," IEEE Transactions on Magnetics, Oct. 2011, pp. 3403-3406, vol. 47, No. 10.

H.J. Richter et al., "Unlocking of Remanent Magnetization of Pole Heads by "Rumble Strips"," IEEE Transactions on Magnetics, Oct. 2005, pp. 3061-3063, vol. 41, No. 10.

H.J. Richter et al., "Unlocking of Remanent Magnetization of Pole Heads by Medium Stray Fields," Applied Physics Letter, 2005, pp. 152508, vol. 86.

U.S. Appl. No. 13/186,445, filed in the name of J.S. Goldberg et al. Jul. 19, 2011 and entitled "Magnetic Storage Device with Chirped Write Head Degaussing Waveform."

U.S. Appl. No. 13/447,741, filed in the name of B. Livshitz et al. Apr. 16, 2012 and entitled "Storage Device Having Degauss Circuitry with Separate Control of Degauss Signal Steady State and Overshoot Portions."

\* cited by examiner

FIG. 4B  LINEAR DECAY

FIG. 4E  EXPONENTIAL DECAY

STORAGE DEVICE HAVING DEGAUSS CIRCUITRY GENERATING DEGAUSS SIGNAL WITH MULTIPLE DECAY SEGMENTS

BACKGROUND

Disk-based storage devices such as hard disk drives (HDDs) are used to provide non-volatile data storage in a wide variety of different types of data processing systems. A typical HDD comprises a spindle which holds one or more flat circular storage disks, also referred to as platters. Each storage disk comprises a substrate made from a non-magnetic material, such as aluminum or glass, which is coated with one or more thin layers of magnetic material. In operation, data is read from and written to tracks of the storage disk via a read/write head that is moved precisely across the disk surface by a positioning arm as the disk spins at high speed.

The storage capacity of HDDs continues to increase, and HDDs that can store multiple terabytes (TB) of data are currently available. However, increasing the storage capacity often involves shrinking track dimensions, bit lengths or other features in order to fit more data onto each storage disk, which can lead to a variety of problems, including degraded on-track recording performance, as well as off-track recording performance issues such as adjacent track erasure and far track erasure.

A number of techniques have been developed in an attempt to further increase storage capacity. For example, a technique known as shingled magnetic recording (SMR) attempts to increase storage capacity of an HDD by "shingling" a given track over a previously written adjacent track on a storage disk. In another technique, referred to as bit-patterned media (BPM), high density tracks of magnetic islands are preformed on the surface of the storage disk, and bits of data are written to respective ones of these islands. Other techniques include, for example, heat-assisted magnetic recording (HAMR) and microwave-assisted magnetic recording (MAMR). The HAMR technique utilizes a laser to locally preheat an area on the disk surface prior to recording in that area. In the MAMR technique, an additional write head is configured to emit an AC magnetic field that excites ferromagnetic resonance in the media, building up energy that eases the process of writing data.

HDDs often include a system-on-chip (SOC) to process data from a computer or other processing device into a suitable form to be written to the storage disk, and to transform signal waveforms read back from the storage disk into data for delivery to the computer. The SOC has extensive digital circuitry and has typically utilized advanced complementary metal-oxide-semiconductor (CMOS) technologies to meet cost and performance objectives. The HDD also generally includes a preamplifier that interfaces the SOC to the read/write head used to read data from and write data to the storage disk. As is well known, the read/write head may comprise, for example, separate read and write heads.

The preamplifier generally comprises one or more write drivers that provide corresponding write signals to the write head in order to write data to the storage disk. Such write signals are generally characterized as current signals, but may alternatively be characterized as voltage signals. Data bits are usually each stored as a group of media grains oriented in a common magnetization direction (e.g., up or down). In order to record a given data bit, the write driver generates a write signal that transitions from a negative write current to a positive write current, or vice-versa, where the magnitude of the write current from zero to its peak value may be in the range of about 15 to 65 milliamperes (mA), although different values can be used. For example, higher peak values up to about 165 mA are used in some implementations.

At the completion of a given write operation, the write head may exhibit remanent magnetization after the write current has been turned off. This residual magnetization or "domain lock up" can be the cause of a phenomenon known as erase after write (EAW), where a non-energized (i.e., zero write current) head is seen to erase or degrade previously-written tracks of the disk. These previously-written tracks may comprise user data or even fixed servo sectors that are used to control the tracking of the radial position of the write head. In order to address the EAW problem, a degauss signal may be applied to the write head by the preamplifier immediately after completion of the write operation.

The typical degauss signal waveform includes current pulses that repeat at a fixed frequency and decay in amplitude over time, usually from a write mode current level to a zero current level or other small final value. The degauss signal waveform is therefore an alternating current waveform, with pulse amplitudes decaying at a specified rate. The waveform may include overshoot on each pulse. In some arrangements of this type, the steady state and overshoot portions of the waveform decay at substantially the same rate. Thus, in such arrangements, the ratio between the steady state and overshoot portions is kept substantially constant for the duration of the degauss signal.

It is also possible to provide separate control mechanisms for controlling respective steady state and overshoot portions of the waveform, such that different decay rates can be provided for each of these portions, as described in U.S. patent application Ser. No. 13/447,741, filed Apr. 16, 2012 in the name of B. Livshitz et al. and entitled "Storage Device Having Degauss Circuitry with Separate Control of Degauss Signal Steady State and Overshoot Portions," which is commonly assigned herewith and incorporated by reference herein.

The frequency of the degauss signal waveform can also be varied. Waveforms of this type are referred to as "chirped" degauss signal waveforms. See U.S. patent application Ser. No. 13/186,445, filed Jul. 19, 2011 in the name of J. S. Goldberg et al. and entitled "Magnetic Storage Device with Chirped Write Head Degaussing Waveform," which is commonly assigned herewith and incorporated by reference herein.

SUMMARY

Illustrative embodiments of the invention provide HDDs or other types of disk-based storage devices that exhibit enhanced operating performance by generating a degauss signal waveform that includes both an alternating current decay segment and a non-alternating current decay segment, the latter being more generally referred to herein as a direct current decay segment. For example, the degauss signal waveform may begin with an alternating current decay segment, followed by a direct current decay segment. Alternatively, the degauss signal waveform may begin with a direct current decay segment, followed by an alternating current decay segment. Numerous other arrangements of multiple alternating current and direct current decay segments are also possible.

In one embodiment, an HDD or other disk-based storage device comprises a storage disk, a write head configured to write data to the disk, and control circuitry coupled to the write head. The control circuitry comprises at least one write driver and degauss circuitry associated with the write driver.

The degauss circuitry is configured to generate a degauss signal to be applied to the write head by the write driver. The degauss signal has a waveform comprising a plurality of decay segments including at least one alternating current decay segment and at least one direct current decay segment. As indicated above, an initial decay segment of the plurality of decay segments may comprise an alternating current decay segment or a direct current decay segment, and may be immediately followed by a decay segment of the opposite type. The decay segments may thus begin with one of an alternating current decay segment and a direct current decay segment and then alternate sequentially between these two decay segment types.

A given alternating current decay segment can use a fixed frequency or a frequency that varies over time, as in the case of a chirped degauss signal waveform.

The sequence of multiple decay segments may comprise any arrangement of two or more distinct decay segments. For example, a given embodiment may include several different types of alternating current decay segments, each with a different decay rate or other characteristics, such as presence or absence of overshoot, or use of a fixed frequency or a variable frequency. Multiple direct current decay segments may also have different decay rates or other characteristics.

The control circuitry may comprise a preamplifier, with the write driver and its associated degauss circuitry being implemented in the preamplifier. A wide variety of other control circuitry arrangements may be used in implementing the invention.

One or more of the embodiments of the invention provide significant improvements in disk-based storage devices. For example, by providing a degauss signal waveform having one or more alternating current decay segments interspersed with one or more direct current decay segments, improved write head demagnetization is achieved after each of a plurality of write operations in which data is written to the storage disk, thereby avoiding the above-noted EAW problem and leading to improved recording performance for respective subsequent write operations.

BRIEF DESCRIPTION OF THE DRAWINGS

FIGS. 4A through 4C illustrate exemplary degauss signal waveforms with alternating current and direct current decay segments following a linear decay envelope.

FIGS. 4D through 4F illustrate exemplary degauss signal waveforms with alternating current and direct current decay segments following an exponential decay envelope.

DETAILED DESCRIPTION

Embodiments of the invention will be illustrated herein in conjunction with exemplary disk-based storage devices, write drivers and associated degauss circuitry for generating a degauss signal having a waveform with at least one alternating current decay segment and at least one direct current decay segment. It should be understood, however, that these and other embodiments of the invention are more generally applicable to any storage device in which improved head demagnetization and operating performance are desired. Additional embodiments may be implemented using components other than those specifically shown and described in conjunction with the illustrative embodiments.

Figure 1:
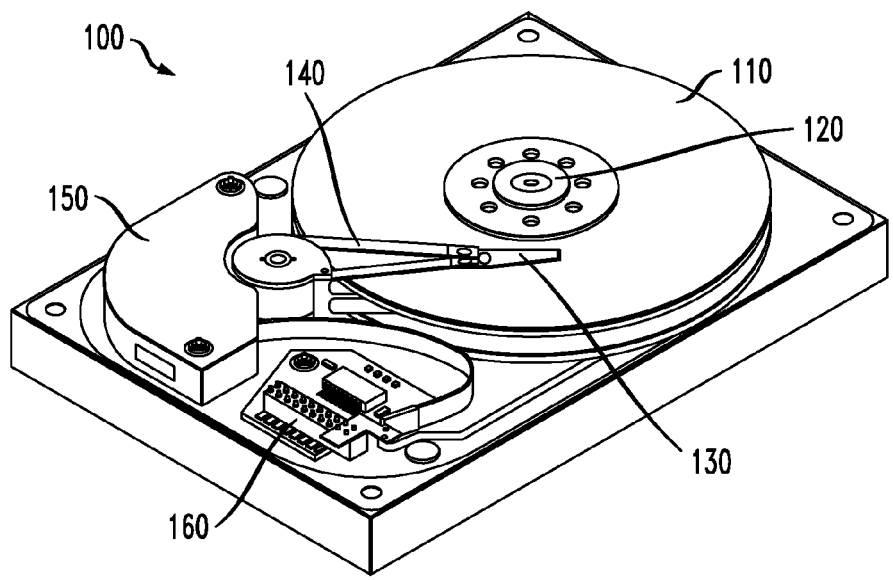
FIG. 1 shows a perspective view of a disk-based storage device in accordance with an illustrative embodiment of the invention.

FIG. 1 shows a disk-based storage device 100 in accordance with an illustrative embodiment of the invention. The storage device 100 in this embodiment more specifically comprises an HDD that includes a storage disk 110. The storage disk 110 has a storage surface coated with one or more magnetic materials that are capable of storing data bits in the form of respective groups of media grains oriented in a common magnetization direction (e.g., up or down). The storage disk 110 is connected to a spindle 120. The spindle 120 is driven by a spindle motor, not explicitly shown in the figure, in order to spin the storage disk 110 at high speed.

Data is read from and written to the storage disk 110 via a read/write head 130 that is mounted on a positioning arm 140. It is to be appreciated that the head 130 is shown only generally in FIG. 1. The position of the read/write head 130 over the magnetic surface of the storage disk 110 is controlled by an electromagnetic actuator 150. The electromagnetic actuator 150 and its associated driver circuitry in the present embodiment may be viewed as comprising a portion of what is more generally referred to herein as "control circuitry" of the storage device 100. Such control circuitry in this embodiment is assumed to further include additional electronics components arranged on an opposite side of the assembly and therefore not visible in the perspective view of FIG. 1. Examples of such additional components will be shown in other figures, such as FIGS. 3, 5A and 5B.

The term "control circuitry" as used herein is therefore intended to be broadly construed so as to encompass, by way of example and without limitation, drive electronics, signal processing electronics, and associated processing and memory circuitry, and may encompass additional or alternative elements utilized to control positioning of a read/write head relative to a storage surface of a storage disk in a storage device. A connector 160 is used to connect the storage device 100 to a host computer or other related processing device.

It is to be appreciated that, although FIG. 1 shows an embodiment of the invention with only one instance of each of the single storage disk 110, read/write head 130, and positioning arm 140, this is by way of illustrative example only, and alternative embodiments of the invention may comprise multiple instances of one or more of these or other drive components. For example, one such alternative embodiment may comprise multiple storage disks attached to the same spindle so all such disks rotate at the same speed, and multiple read/write heads and associated positioning arms coupled to one or more actuators. Also, both sides of storage disk 110 and any other storage disks in a particular embodiment may be used to store data and accordingly may be subject to read and write operations, through appropriate configuration of one or more read/write heads.

A given read/write head as that term is broadly used herein may be implemented in the form of a combination of separate read and write heads. More particularly, the term "read/write" as used herein is intended to be construed broadly as read and/or write, such that a read/write head may comprise a read head only, a write head only, a single head used for both reading and writing, or a combination of separate read and write heads. A given read/write head such as read/write head 130 may therefore include both a read head and a write head. Such heads may comprise, for example, write heads with wrap-around or side-shielded main poles, or any other types of heads suitable for recording and/or reading data on a storage disk. Read/write head 130 when performing write operations may be referred to herein as simply a write head.

Also, the storage device 100 as illustrated in FIG. 1 may include other elements in addition to or in place of those specifically shown, including one or more elements of a type commonly found in a conventional implementation of such a storage device. These and other conventional elements, being well understood by those skilled in the art, are not described in detail herein. It should also be understood that the particular arrangement of elements shown in FIG. 1 is presented by way of illustrative example only. Those skilled in the art will recognize that a wide variety of other storage device configurations may be used in implementing embodiments of the invention.

Figure 2:
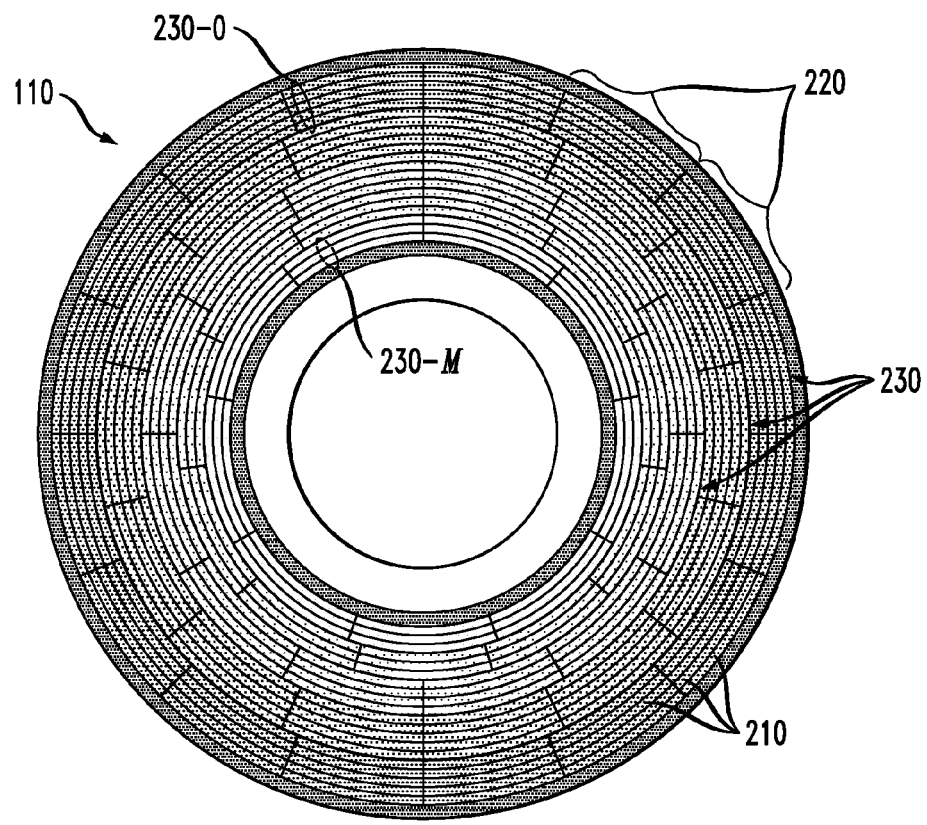
FIG. 2 shows a plan view of a storage disk in the storage device of FIG. 1.

FIG. 2 shows the storage surface of the storage disk 110 in greater detail. As illustrated, the storage surface of storage disk 110 comprises a plurality of concentric tracks 210. Each track is subdivided into a plurality of sectors 220 which are capable of storing a block of data for subsequent retrieval. The tracks located toward the outside edge of the storage disk have a larger circumference when compared to those located toward the center of the storage disk. The tracks are grouped into several annular zones 230, where the tracks within a given one of the zones have the same number of sectors. Those tracks in the outer zones have more sectors than those located in the inner zones. In this example, it is assumed that the storage disk 110 comprises M+1 zones, including an outermost zone 230-0 and an innermost zone 230-M.

The outer zones of the storage disk 110 provide a higher data transfer rate than the inner zones. This is in part due to the fact that the storage disk in the present embodiment, once accelerated to rotate at operational speed, spins at a constant angular or radial speed regardless of the positioning of the read/write head, but the tracks of the inner zones have smaller circumference than those of the outer zones. Thus, when the read/write head is positioned over one of the tracks of an outer zone, it covers a greater linear distance along the disk surface for a given 360° turn of the storage disk than when it is positioned over one of the tracks of an inner zone. Such an arrangement is referred to as having constant angular velocity (CAV), since each 360° turn of the storage disk takes the same amount of time, although it should be understood that CAV operation is not a requirement of embodiments of the invention.

Data bit density is generally constant across the entire storage surface of the storage disk 110, which results in higher data transfer rates at the outer zones. Accordingly, the outermost annular zone 230-0 of the storage disk has a higher average data transfer rate than the innermost annular zone 230-M of the storage disk. The average data transfer rates may differ between the innermost and outermost annular zones in a given embodiment by more than a factor of two. As one example embodiment, provided by way of illustration only, the outermost annular zone may have a data transfer rate of approximately 2.3 Gigabits per second (Gb/s), while the innermost annular zone has a data transfer rate of approximately 1.0 Gb/s. In such an implementation, the HDD may more particularly have a total storage capacity of 500 GB and a spindle speed of 7200 RPM, with the data transfer rates ranging, as noted above, from about 2.3 Gb/s for the outermost zone to about 1.0 Gb/s for the innermost zone.

The storage disk 110 may be assumed to include a timing pattern formed on its storage surface. Such a timing pattern may comprise one or more sets of servo address marks (SAMs) or other types of servo marks formed in particular sectors in a conventional manner. SAMs may therefore be viewed as an example of what are more specifically referred to herein as servo marks.

The particular data transfer rates and other features referred to in the embodiment described above are presented for purposes of illustration only, and should not be construed as limiting in any way. A wide variety of other data transfer rates and storage disk configurations may be used in other embodiments.

Embodiments of the invention will be described below in conjunction with FIGS. 3 to 8, in which the storage device 100 of FIG. 1 is configured to implement at least one write driver and associated degauss circuitry. By way of example, the write driver may be configured to operate in write and degauss modes of operation. In a write mode of operation, data is provided to the write driver by the SOC 304, and in the degauss mode a degauss signal is generated by the degauss circuitry and provided to the write driver. The degauss signal has a waveform comprising a plurality of decay segments including at least one alternating current decay segment and at least one direct current decay segment. More particularly, in these embodiments, the degauss signal waveform begins with one of the alternating current or direct current decay segments, and that initial decay segment is immediately followed by another decay segment of the opposite type. Examples of degauss signal waveforms of this type will be described in greater detail below in conjunction with FIGS. 4A through 4F.

A given alternating current decay segment can use a fixed frequency or a frequency that varies over time, as in the case of a chirped degauss signal waveform. Other characteristics of the alternating current decay segments can also be varied, such as the type and amount of overshoot.

Figure 3:
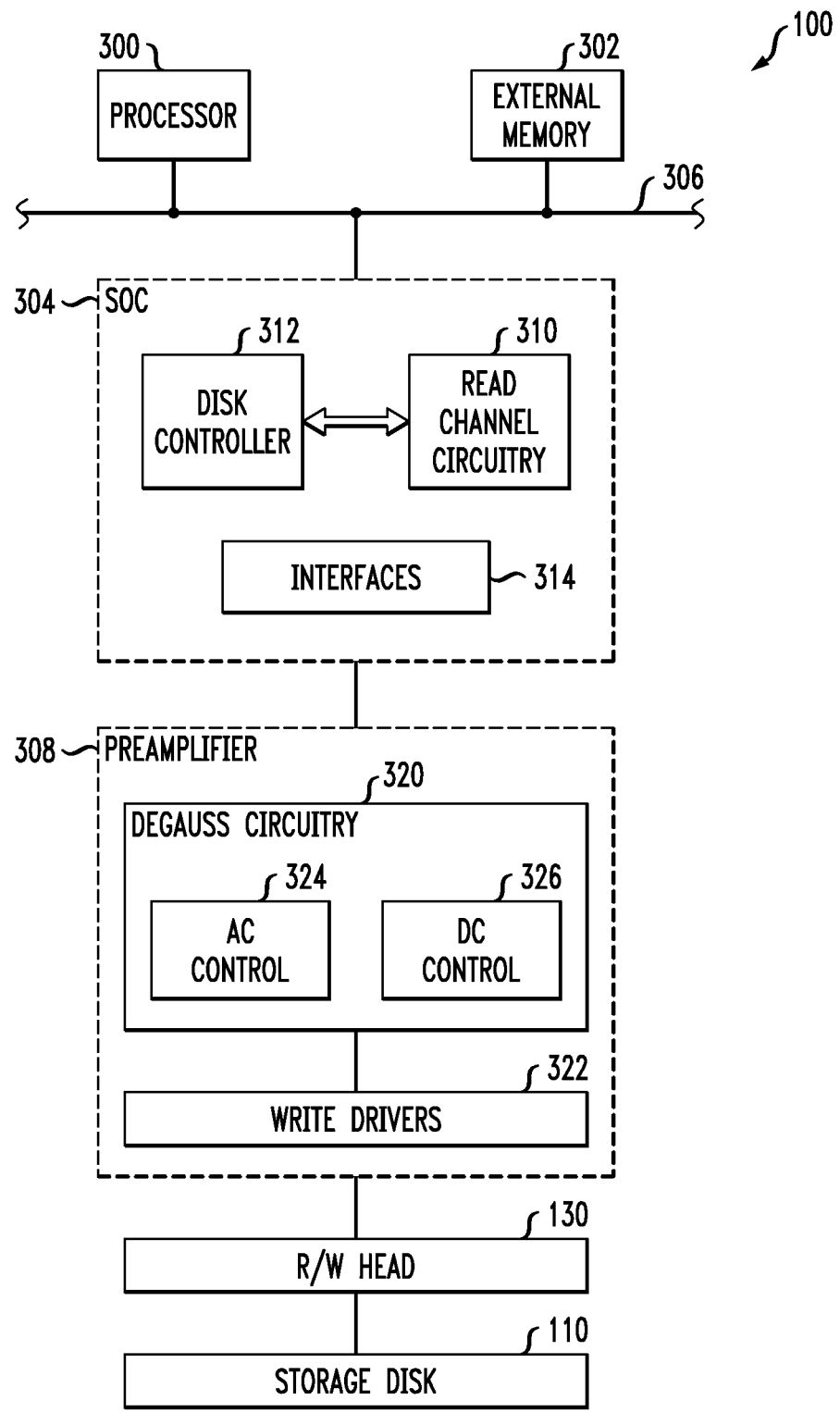
FIG. 3 is a block diagram of a portion of the storage device of FIG. 1 including a preamplifier comprising one or more write drivers and associated degauss circuitry.

FIG. 3 shows a portion of the storage device 100 of FIG. 1 in greater detail. In this view, the storage device 100 comprises a processor 300, a memory 302 and a system-on-a-chip (SOC) 304, which communicate over a bus 306. The storage device further comprises a preamplifier 308 providing an interface between the SOC 304 and the read/write head 130. The memory 302 is an external memory relative to the SOC 304 and other components of the storage device 100, but is nonetheless internal to that storage device. The SOC 304 in the present embodiment includes read channel circuitry 310 and a disk controller 312, and directs the operation of the read/write head 130 in reading data from and writing data to the storage disk 110.

The bus 306 may comprise, for example, one or more interconnect fabrics. Such fabrics may be implemented in the present embodiment as Advanced eXtensible Interface (AXI) fabrics, described in greater detail in, for example, the Advanced Microcontroller Bus Architecture (AMBA) AXI v2.0 Specification, which is incorporated by reference herein. The bus may also be used to support communications between other system components, such as between the SOC 304 and the preamplifier 308. It should be understood that AXI interconnects are not required, and that a wide variety of other types of bus configurations may be used in embodiments of the invention.

The processor 300, memory 302, SOC 304 and preamplifier 308 may be viewed as collectively comprising one possible example of "control circuitry" as that term is utilized herein. Numerous alternative arrangements of control circuitry may be used in other embodiments, and such arrangements may include only a subset of the components 300, 302, 304 and 308, or portions of one or more of these components. For example, the SOC 304 itself may be viewed as an example of "control circuitry." The control circuitry of the storage device 100 in the embodiment as shown in FIG. 3 is generally configured to process data received from and supplied to the read/write head 130 and to control positioning of the read/write head 130 relative to the storage disk 110.

It should be noted that certain operations of the SOC 304 in the storage device 100 of FIG. 3 may be directed by processor 300, which executes code stored in external memory 302. For example, the processor 300 may be configured to execute code stored in the memory 302 for performing at least a portion of a degaussing process carried out by the SOC 304. Thus, at least a portion of the degauss signal generation functionality of the storage device 100 may be implemented at least in part in the form of software code.

The external memory 302 may comprise electronic memory such as random access memory (RAM) or read-only memory (ROM), in any combination. In the present embodiment, it is assumed without limitation that the external memory 302 is implemented at least in part as a double data rate (DDR) synchronous dynamic RAM (SDRAM), although a wide variety of other types of memory may be used in other embodiments. The memory 302 is an example of what is more generally referred to herein as a "computer-readable storage medium." Such a medium may also be writable.

Although the SOC 304 in the present embodiment is assumed to be implemented on a single integrated circuit, that integrated circuit may further comprise portions of the processor 300, memory 302, bus 306 and preamplifier 308. Alternatively, portions of the processor 300, memory 302, bus 306 and preamplifier 308 may be implemented at least in part in the form of one or more additional integrated circuits, such as otherwise conventional integrated circuits designed for use in an HDD and suitably modified to implement degauss circuitry for generating a degauss signal waveform having multiple distinct alternating current and direct current decay segments as disclosed herein.

An example of an SOC integrated circuit that may be modified for use in embodiments of the invention is disclosed in U.S. Pat. No. 7,872,825, entitled "Data Storage Drive with Reduced Power Consumption," which is commonly assigned herewith and incorporated by reference herein.

Other types of integrated circuits that may be used to implement processor, memory or other storage device components of a given embodiment include, for example, a microprocessor, digital signal processor (DSP), application-specific integrated circuit (ASIC), field-programmable gate array (FPGA) or other integrated circuit device.

In an embodiment comprising an integrated circuit implementation, multiple integrated circuit dies may be formed in a repeated pattern on a surface of a wafer. Each such die may include degauss circuitry as described herein, and may include other structures or circuits. The dies are cut or diced from the wafer, then packaged as integrated circuits. One skilled in the art would know how to dice wafers and package dies to produce packaged integrated circuits. Integrated circuits so manufactured are considered embodiments of the invention.

Although shown as part of the storage device 100 in the present embodiment, one or both of the processor 300 and memory 302 may be implemented at least in part within an associated processing device, such as a host computer or server in which the storage device is installed. Accordingly, elements 300 and 302 in the FIG. 3 embodiment may be viewed as being separate from the storage device 100, or as representing composite elements each including separate processing or memory circuitry components from both the storage device and its associated processing device. As noted above, at least portions of the processor 300 and memory 302 may be viewed as comprising "control circuitry" as that term is broadly defined herein.

Referring now more particularly to the preamplifier 308 of the storage device 100, the preamplifier in this embodiment comprises degauss circuitry 320 and associated write drivers 322. The degauss circuitry 320 comprises an alternating current (AC) control module 324 and a direct current (DC) control module 326 for use in controlling respective AC and DC decay segments of a degauss signal waveform. The degauss circuitry 320 is configured to generate a degauss signal to be applied to the write head by one or more of the write drivers 322. The AC and DC control modules 324 and 326 comprise separate control mechanisms for AC and DC decay segments of the degauss signal waveform.

Additional control circuitry comprising sequencing circuitry associated with the AC and DC control modules 324 and 326 may also be included in the degauss circuitry 320, to control ordering of the decay segments and transitions between the decay segments. Such sequencing circuitry may be provided, for example, as a separate module coupled to the AC and DC control modules 324 and 326, or may be wholly or partially incorporated into one or both of these modules. Examples of the AC and DC control modules and associated sequencing circuitry will be described in greater detail below in conjunction with FIGS. 5A and 5B.

A given write driver 322 in the present embodiment may comprise multiple distinct data paths, such as a high side data path and a low side data path, although different numbers of data paths may be used in other embodiments. It should be noted in this regard that the term "data path" as used herein is intended to be broadly construed, so as to encompass, for example, CMOS circuitry or other types of circuitry through which a data signal passes in preamplifier 308 or another storage device component.

Also, the term "write driver" is intended to encompass any type of driver circuitry that may be used to deliver or otherwise provide one or more degauss signals to the write head of the storage device 100. By way of example, a given one of the write drivers 322 may comprise an X side and a Y side, each comprising both high side and low side drivers, where the X and Y sides are driven on opposite write cycles. Numerous alternative arrangements of circuitry are possible in other write driver embodiments.

Although illustratively shown in FIG. 3 as being separate from the write drivers 322, the degauss circuitry 320 may alternatively be implemented at least in part internally to the write drivers 322.

As noted above, examples of degauss signal waveforms that may be generated by the degauss circuitry 322 are shown in FIGS. 4A through 4F. In each of these examples, the degauss signal waveform comprises a plurality of decay segments including at least one alternating current decay segment and at least one direct current decay segment. More particularly, in these embodiments, the degauss signal waveform begins with one of the alternating current or direct current decay segments, and that initial decay segment is immediately followed by another decay segment of the opposite type.

It was noted previously herein that a typical conventional degauss signal waveform includes current pulses that repeat at a fixed frequency and decay in amplitude over time. This conventional degauss signal waveform is therefore an alternating current waveform, with pulse amplitudes decaying at a specified rate, for substantially the full duration of the degauss signal. The waveform may include overshoot on each pulse. The degauss signal waveforms in FIGS. 4A through 4F differ from this conventional waveform in that they include multiple distinct decay segments, including at least one alternating current decay segment and at least one direct current decay segment.

Figure 4A:
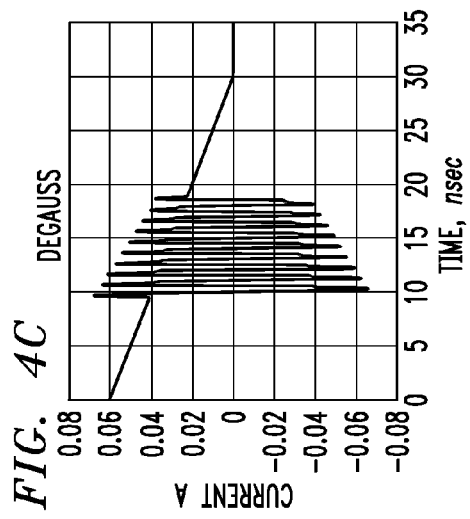
Figure 4C:
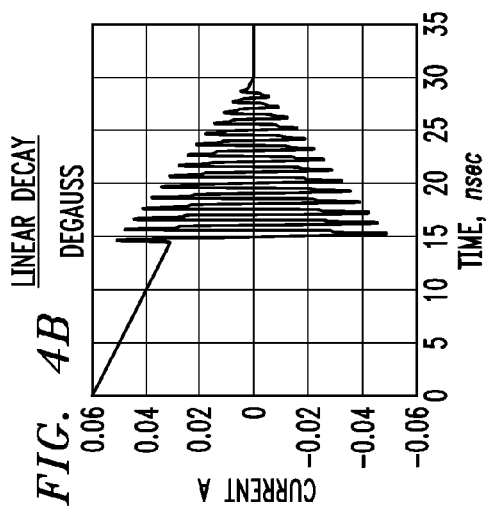
Figure 4C:
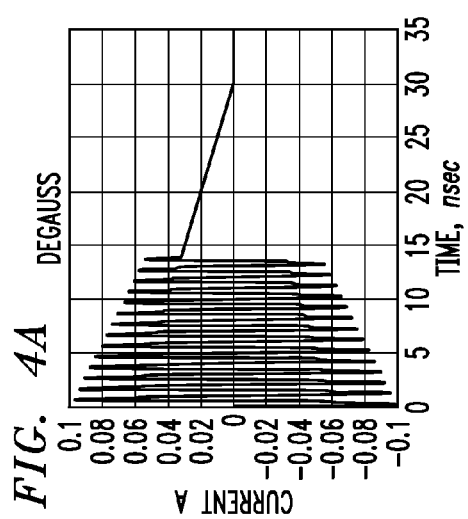
Figure 4D:
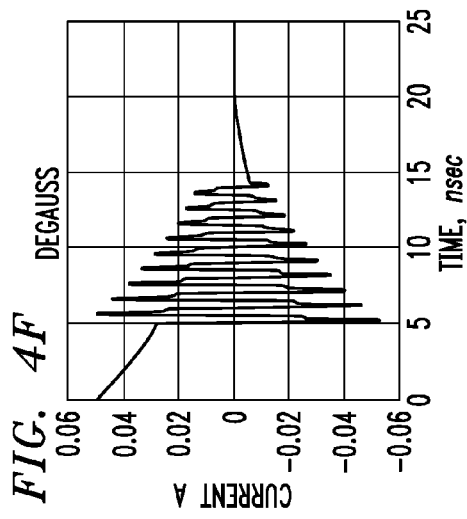
Figure 4F:
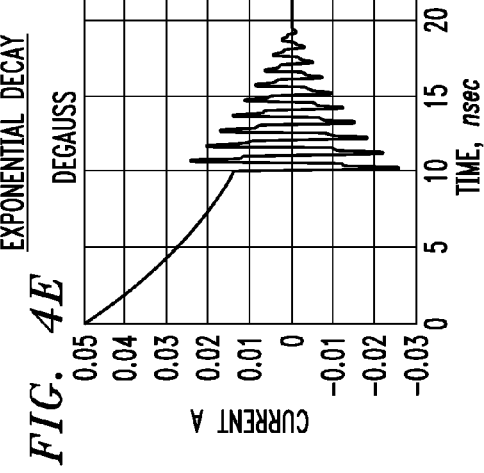
Figure 4F:
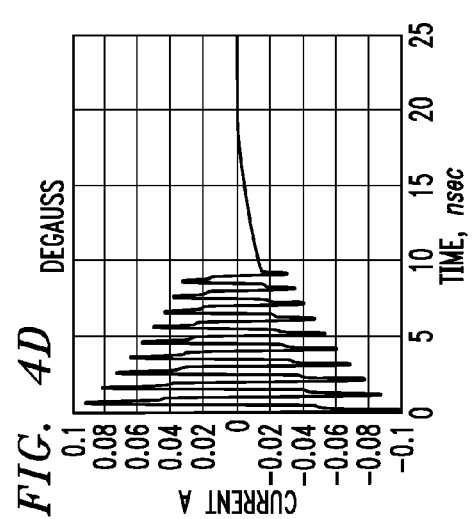

In each of the degauss signal waveform diagrams of FIGS. 4A through 4F, the degauss signal in amperes (A) is plotted as a function of time in nanoseconds (ns). The degauss signal waveform in these examples decays from an initial current amplitude level to a final current amplitude level over the multiple decay segments in accordance with a specified decay envelope. FIGS. 4A, 4B and 4C show degauss signal waveforms that decay in accordance with a linear decay envelope over the multiple decay segments, while FIGS. 4D, 4E and 4F show degauss signal waveforms that decay in accordance with an exponential decay envelope over the multiple decay segments.

The alternating current decay segments in these examples each comprise a plurality of current pulses with a corresponding steady state value that decays in accordance with the specified decay envelope. Similarly, the direct current of the direct current decay segments also decays in accordance with the decay envelope. The current pulses in all of the alternating current decay segments include overshoot, although other embodiments need not include overshoot. Also, in these examples, the steady state and overshoot portions of the alternating current decay segments decay at substantially the same rate, while in other embodiments different decay rates may be used for the steady state and overshoot portions of one or more of the alternating current decay segments, using the techniques disclosed in the above-cited U.S. patent application Ser. No. 13/447,741.

In FIG. 4A, an AC-DC example is shown in which the degauss signal waveform includes an AC decay segment that is immediately followed by a DC decay segment. The DC decay segment in this example has a duration that is similar to that of the AC decay segment, with each of the segments representing about one-half of the overall duration of the degauss signal waveform. The DC segment therefore occupies a time period that would otherwise encompass a significant number of the AC decay segment current pulses.

The opposite arrangement is shown in the DC-AC example of FIG. 4B, where the degauss signal waveform includes a DC decay segment that is immediately followed by an AC decay segment. Again, the AC and DC decay segments in this example have similar durations, each representing about one-half of the overall duration of the degauss signal waveform.

FIG. 4C shows a DC-AC-DC example, where the degauss waveform includes a first DC segment that is followed by an AC segment and then a second DC segment. This may be viewed as an example of an arrangement in which the degauss signal waveform begins with one of an alternating current decay segment and a direct current decay segment and then alternates sequentially between these two decay segment types. As in the FIG. 4B example, the AC and DC decay segments in this example have similar durations, but in this case with each representing about one-third of the overall duration of the degauss signal waveform.

FIGS. 4D, 4E and 4F are similar to the respective linear decay envelope examples of FIGS. 4A, 4B and 4C, but with an exponential decay envelope as noted above.

The particular examples presented in FIGS. 4A through 4F are for purposes of illustration only and should not be construed as limiting in any way. Numerous other degauss signal waveforms may be used, in which a sequence of multiple decay segments comprises any arrangement of two or more distinct decay segments. For example, a given embodiment may include several different types of alternating current decay segments, each with a different decay rate or other characteristics, such as presence or absence of overshoot, or use of a fixed frequency or a variable frequency. Multiple direct current decay segments may also have different decay rates or other characteristics.

Moreover, the relative durations of the various segments need not be substantially the same. For example, in other embodiments a given AC or DC decay segment may be much longer than one or more other decay segments of the degauss signal waveform. Other parameters that may be varied include the frequency of the AC decay segment current pulses, as well as the duration of the degauss signal itself. In some embodiments, the AC decay segment frequency may be on the order of 1 GHz, and the degauss signal duration may be between about 5 and 50 ns, although other values can be used. As indicated previously, the AC decay segment frequency may be fixed or variable.

Figure 5A:
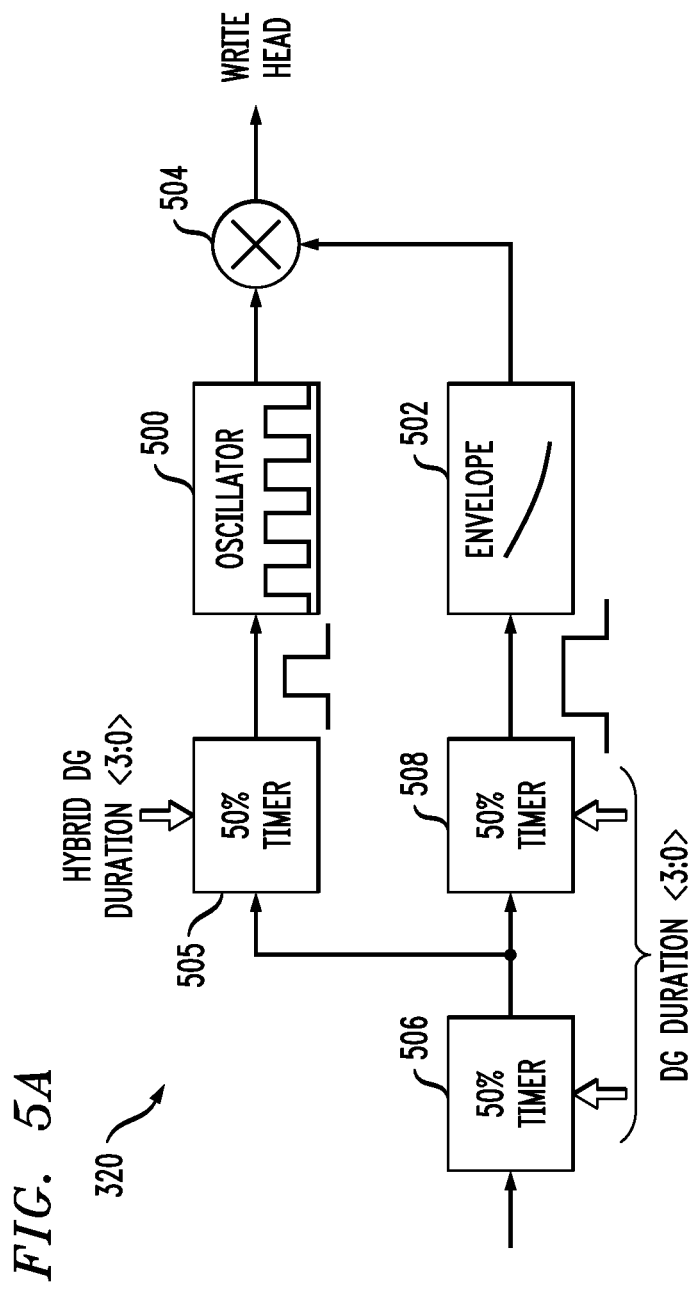
FIGS. 5A and 5B show respective time-based and amplitude-based control implementations of degauss circuitry suitable for generating degauss signal waveforms of the type shown in FIGS. 4A and 4D.

Referring now to FIG. 5A, one possible time-based control implementation of the degauss circuitry 320 is shown, suitable for generating a degauss signal having a waveform of the type shown in FIGS. 4A and 4D. In this embodiment, the AC control 324 comprises an oscillator 500 and the DC control 326 comprises an envelope generator 502. Also included in the degauss circuitry is a signal combiner 504 configured to combine the outputs of the oscillator 500 and the envelope generator 502, and timers 505, 506 and 508, each of which is illustratively implemented as a 50% timer, although other values could be used. The timers 506 and 508 receive a degauss (DG) duration control signal which is implemented as a four-bit control signal that adjusts the overall duration of the degauss signal waveform. Similarly, the timer 505 receives a hybrid DG duration control signal, also implemented as a four-bit control signal, that controls the relative durations of the AC and DC decay segments within the overall degauss signal waveform. The timers 505, 506 and 508 may be collectively viewed as one possible example of what is more generally referred to herein as "sequencing circuitry."

In the present embodiment, the timers 505, 506 and 508 are utilized to establish a time ratio between the AC and DC decay segments of the degauss signal waveform. An output of the timer 505 controls operation of the oscillator 500, and an output of the timer 508 controls operation of the envelope generator 502. Since timer 505 is decoupled from timer 508, the oscillator 500 can be stopped before the end of the degauss signal, and thus before the envelope has decayed to its final value. As a result, the initial portion of the degauss signal waveform includes AC oscillation that decays in conformance with the envelope, while the remaining portion includes only DC current that decays in conformance with the envelope, as illustrated in the linear decay and exponential decay examples of respective FIGS. 4A and 4D.

Other types of sequencing circuitry may be incorporated into degauss circuitry 320 in other embodiments, and may be operative to control at least one of ordering and relative duration of at least a subset of the multiple decay segments of the degauss signal waveform responsive to one or more control signals.

Figure 5B:
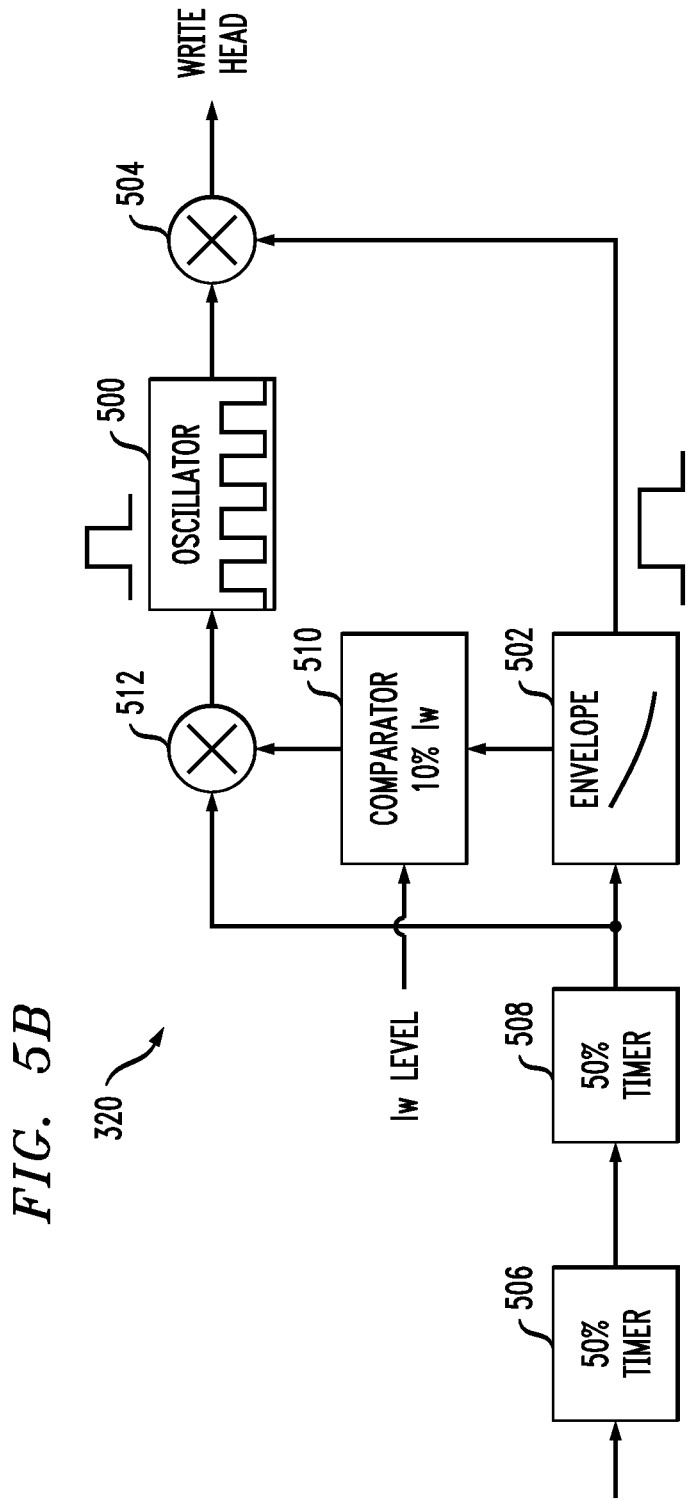

Another embodiment of the degauss circuitry 320 is shown in FIG. 5B. This embodiment implements amplitude-based control, and includes oscillator 500, envelope generator 502, signal combiner 504, and timers 506 and 508, all of which operate substantially as previously described. However, in this embodiment, the transition between the AC decay segment and the DC decay segment is controlled by comparator 510, which generates an output that is applied to the oscillator 500 via an additional signal combiner 512. The comparator 510 compares the decay envelope with a predefined current level and turns off the oscillator 500 when the envelope reaches the predefined current level. In this particular example, the predefined current level is specified as a percentage of a steady state write current Iw, and more particularly as 10% of Iw, although other predefined current levels and percentages may be used in other embodiments. The comparator 510 in the present embodiment may also be viewed as a type of "sequencing circuitry," as the latter term is intended to be broadly construed herein.

Figure 6:
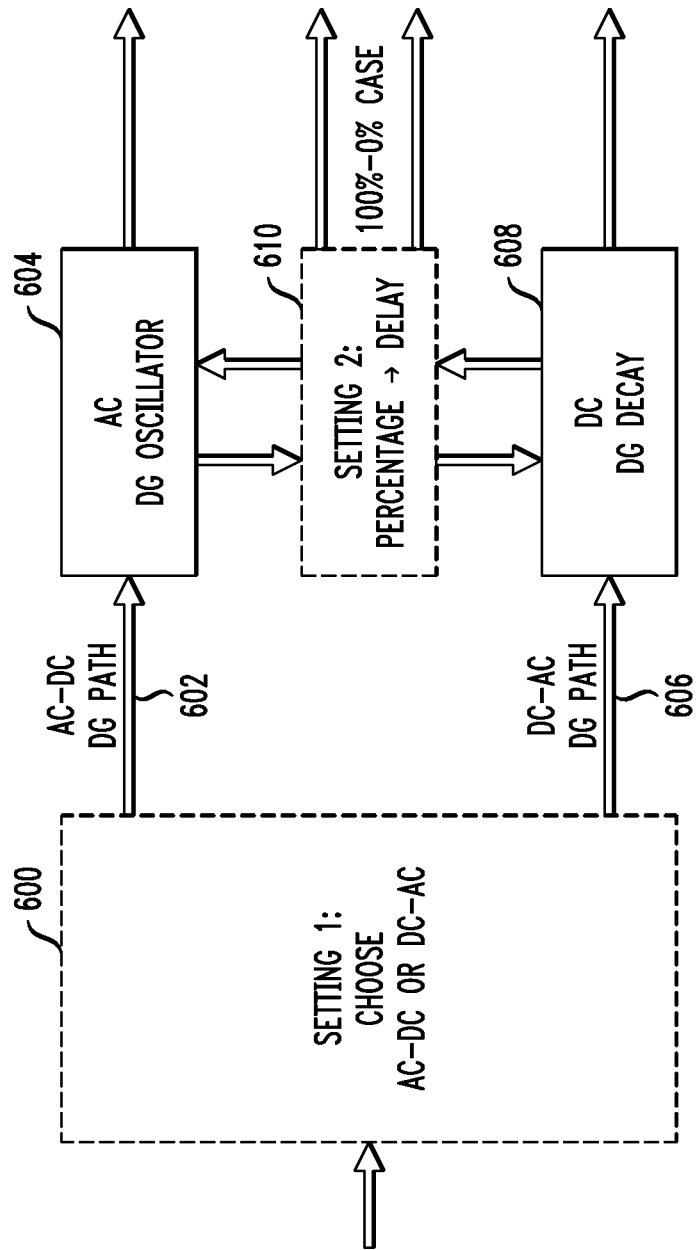
FIG. 6 is a flow diagram of a degaussing process implemented in the FIG. 1 storage device in an illustrative embodiment.

Referring now to FIG. 6, a degaussing process implemented in the FIG. 1 storage device in an illustrative embodiment includes steps 600 through 610 as indicated. After completing a write of a given sector of data, the write current will need to be turned off in many cases. However, if the write head is known or suspected to produce EAW, then the write current is set to degauss mode immediately following a write mode, before it is turned off, in order to prevent write head remanent magnetization from affecting other areas of the magnetic storage surface, including data sectors and servo sectors.

In the FIG. 6 process, there are two settings, denoted Setting 1 and Setting 2, associated with respective steps 600 and 610. There are also two different possible degauss paths, including an AC-DC degauss path 602 which produces a degauss signal waveform of the type shown in FIG. 4A or FIG. 4D, and a DC-AC degauss path 606 which produces a degauss signal waveform of the type shown in FIG. 4B or FIG. 4E.

Setting 1 in step 600 involves choosing between an AC-DC mode of operation and a DC-AC mode of operation for degauss circuitry 320. If the AC-DC mode is selected, the process follows the AC-DC degauss path 602 to AC degauss oscillator step 604 and if the DC-AC mode is selected, the process follows the DC-AC degauss path 606 to DC degauss decay step 608. The direction of the selected path therefore indicates the type of decay segment that will be used as the initial decay segment of the degauss signal waveform. Although only two distinct decay segments are contemplated in this embodiment, namely an AC decay segment followed by a DC decay segment or vice-versa, other embodiments can include more than two decay segments, as illustrated, for example, in FIGS. 4C and 4F.

Setting 2 in step 610 involves establishing relative durations of the AC and DC decay segments, in this embodiment in terms of a percentage that may vary between 100% and 0% to indicate the delay in transition from the initial AC or DC decay segment to the following DC or AC decay segment. Thus, for example, a setting of 50% will result in a degauss signal waveform in which the AC and DC decay segments each have a duration that is approximately 50% of the full degauss signal duration. Settings of 0% or 100% may indicate a degauss signal waveform with only an AC decay segment or only a DC decay segment, depending upon the initial selection performed in Setting 1.

The various steps shown in FIG. 6 may be performed at least in part in parallel with one another. Thus, the settings referred to in this process may be made substantially simultaneously, prior to generating the appropriate degauss signal based upon those settings. Numerous other degauss processes using additional or alternative steps may be used in other embodiments.

The illustrative embodiments provide a number of significant advantages relative to conventional degaussing arrangements. For example, these embodiments allow the degauss waveform to be better tailored to the physical configuration of the write head. It is expected that certain types of write heads may benefit from a degauss waveform that begins with an AC decay segment and ends with a DC segment, while other types of write heads may benefit from a degauss waveform that begins with a DC decay segment and ends with an AC decay segment. In addition, these arrangements in some embodiments allow an improved demagnetization effect to be achieved using a shorter degauss signal duration, which can lead to higher data throughput in the storage device. Moreover, use of both AC and DC decay segments allows the degauss waveform shape to be more accurately controlled, thereby avoiding spikes, glitches and other signal imperfections, again leading to improved demagnetization of the write head. Embodiments of the present invention can therefore produce better write head demagnetization, shorter degaussing time, or both. This is particularly true for write heads that may not be optimally demagnetized using conventional degauss signals.

It is to be appreciated that the particular circuitry arrangements, degauss signal waveforms and degauss process operations shown in FIGS. 3-6 are presented by way of example only, and other embodiments of the invention may utilize other types and arrangements of elements for generating degauss signal waveforms comprising both AC and DC decay segments as disclosed herein.

Also, numerous degauss waveform parameters may be varied in other embodiments, including degauss signal duration, initial and final current amplitudes, types and arrangements of segments, decay envelope shape, presence or absence of overshoot within a given segment, manner of control of steady state and overshoot portions of a given AC decay segment, AC decay segment current pulse frequency, and so on.

In addition, numerous other types of control mechanisms may be used to establish different arrangements of distinct alternating current and direct current decay segments in a given degauss signal waveform.

As mentioned previously, the storage device configuration can be varied in other embodiments of the invention. For example, the storage device may comprise a hybrid HDD which includes a flash memory in addition to one or more storage disks.

It should also be understood that the particular storage disk configuration and recording mechanism can be varied in other embodiments of the invention. For example, a variety of recording techniques including SMR, BPM, HAMR and MAMR can be used in one or more embodiments of the invention.

Figure 7:
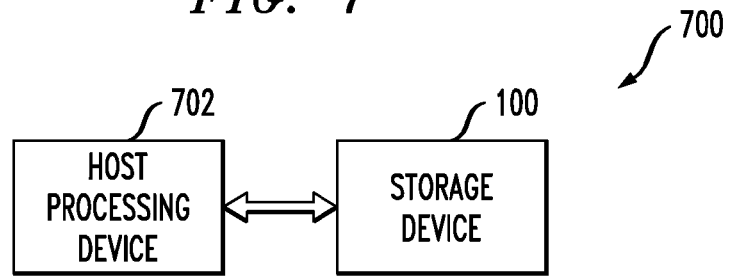
FIG. 7 illustrates interconnection of the storage device of FIG. 1 with a host processing device in a data processing system.

FIG. 7 illustrates a processing system 700 comprising the disk-based storage device 100 coupled to a host processing device 702, which may be a computer, server, communication device, etc. Although shown as a separate element in this figure, the storage device 100 may be incorporated into the host processing device. Instructions such as read commands and write commands directed to the storage device 100 may originate from the processing device 702, which may comprise processor and memory elements similar to those previously described in conjunction with FIG. 3.

Figure 8:
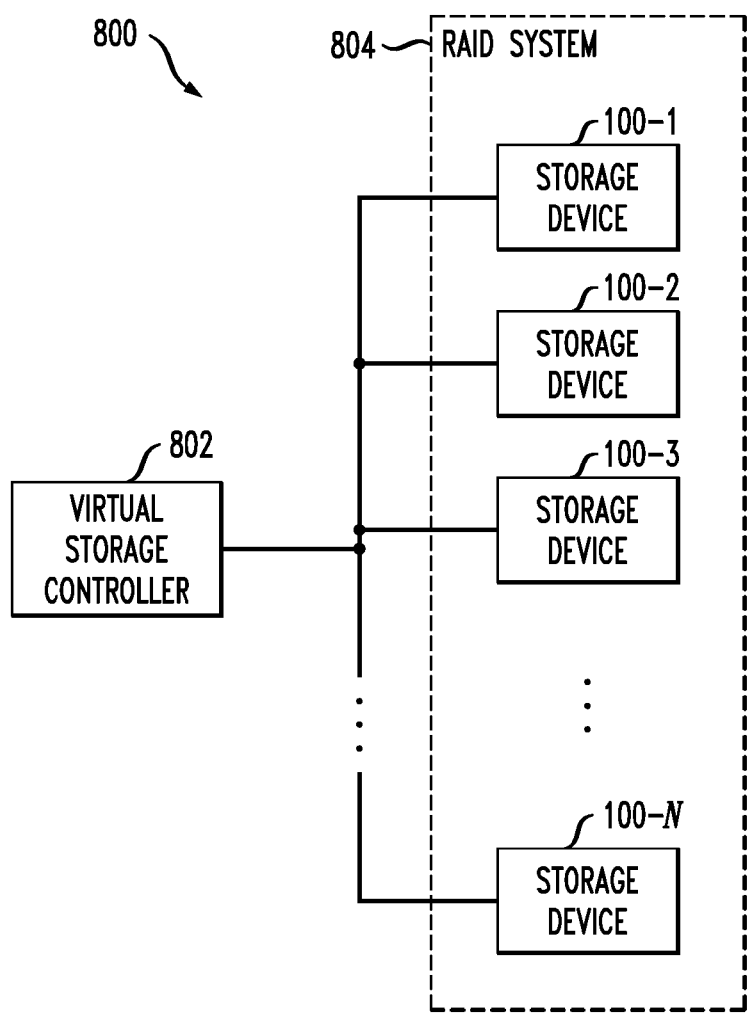
FIG. 8 shows a virtual storage system incorporating a plurality of disk-based storage devices of the type shown in FIG. 1.

Multiple storage devices 100-1 through 100-N possibly of various different types may be incorporated into a virtual storage system 800 as illustrated in FIG. 8. The virtual storage system 800, also referred to as a storage virtualization system, illustratively comprises a virtual storage controller 802 coupled to a RAID system 804, where RAID denotes Redundant Array of Independent storage Devices. The RAID system more specifically comprises N distinct storage devices denoted 100-1, 100-2, . . . 100-N, one or more of which may be HDDs and one or more of which may be solid state drives. Furthermore, one or more of the HDDs of the RAID system are assumed to be configured to include degauss circuitry configured to generate a degauss signal having a waveform with distinct AC and DC decay segments as disclosed herein. These and other virtual storage systems comprising HDDs or other storage devices of the type disclosed herein are considered embodiments of the invention. The host processing device 702 in FIG. 7 may also be an element of a virtual storage system, and may incorporate the virtual storage controller 802.

Again, it should be emphasized that the above-described embodiments of the invention are intended to be illustrative only. For example, other embodiments can use different types and arrangements of storage disks, write heads, control circuitry, preamplifiers, write drivers, degauss circuitry and other storage device elements for implementing the described degauss signal generation. Also, the particular manner in which multiple distinct AC and DC decay segments are arranged within the degauss signal waveform, and the various parameters used for each of the decay segments, may be varied in other embodiments. These and numerous other alternative embodiments within the scope of the following claims will be apparent to those skilled in the art.

What is claimed is:

1. An apparatus comprising:
control circuitry adapted for coupling to a write head configured to write data to a storage disk;
wherein the control circuitry comprises:
a write driver; and
degauss circuitry associated with the write driver and configured to generate a degauss signal to be applied to the write head by the write driver, the degauss signal having a waveform comprising a plurality of decay segments including at least one alternating current decay segment and at least one direct current decay segment.

2. The apparatus of claim 1 wherein the degauss circuitry comprises:
an alternating current controller configured for controlling said at least one alternating current decay segment of the degauss signal waveform;
a direct current controller for controlling said at least one direct current decay segment of the degauss signal waveform; and
sequencing circuitry associated with the alternating current and direct current controllers and operative to control ordering of the decay segments and transitions between the decay segments.

3. The apparatus of claim 1 wherein the degauss signal waveform decays from an initial current amplitude level to a final current amplitude level over the plurality of decay segments in accordance with a specified decay envelope.

4. The apparatus of claim 1 wherein the degauss signal waveform decays in accordance with a linear decay envelope over the plurality of decay segments.

5. The apparatus of claim 1 wherein the degauss signal waveform decays in accordance with an exponential decay envelope over the plurality of decay segments.

6. The apparatus of claim 1 wherein an initial decay segment of the plurality of decay segments comprises a first alternating current decay segment, and the first alternating current decay segment is immediately followed by a first direct current decay segment.

7. The apparatus of claim 1 wherein an initial decay segment of the plurality of decay segments comprises a first direct current decay segment, and the first direct current decay segment is immediately followed by a first alternating current decay segment.

8. The apparatus of claim 1 wherein the plurality of decay segments begins with one of an alternating current decay segment and a direct current decay segment and then alternates sequentially between these two decay segment types.

9. The apparatus of claim 1 wherein a given one of the alternating current decay segments has one of a fixed frequency and a variable frequency and comprises current pulses that repeat at the fixed or variable frequency and are characterized by a decay envelope that decays in accordance with a specified decay rate.

10. The apparatus of claim 1 wherein a given one of the direct current decay segments comprises a direct current characterized by a decay envelope that decays in accordance with a specified decay rate.

11. The apparatus of claim 1 wherein the degauss circuitry further comprises sequencing circuitry operative to control at least one of ordering and relative duration of at least a subset of the plurality of decay segments responsive to one or more control signals.

12. The apparatus of claim 11 wherein a given one of the control signals comprises a multi-bit control signal with different values of said control signal specifying different relative durations of the alternating current and direct current decay segments.

13. The apparatus of claim 1 wherein the control circuitry is fabricated in at least one integrated circuit.

14. A storage device comprising the apparatus of claim 1.

15. A virtual storage system comprising the storage device of claim 14.

16. The apparatus of claim 1 wherein the control circuitry further comprises:
at least one integrated circuit comprising a disk controller; and
a preamplifier coupled between said at least one integrated circuit and the write head;
wherein the write driver and its associated degauss circuitry are implemented in the preamplifier.

17. A method comprising the steps of:
writing data to a storage disk via a write head of a storage device;
generating a degauss signal having a waveform comprising a plurality of decay segments including at least one alternating current decay segment and at least one direct current decay segment; and
applying the degauss signal to the write head of the storage device.

18. The method of claim 17 wherein the generating step comprises controlling at least one of ordering and relative duration of at least a subset of the plurality of decay segments responsive to one or more control signals.

19. A non-transitory computer-readable storage medium having embodied therein executable code for performing the steps of the method of claim 17.

20. A processing system comprising:
a processing device; and
a storage device coupled to the processing device and comprising at least one storage disk;
wherein the storage device further comprises:
a write head configured to write data to the storage disk; and
control circuitry coupled to the write head;
the control circuitry comprising:
a write driver; and
degauss circuitry associated with the write driver and configured to generate a degauss signal to be applied to the write head by the write driver, the degauss signal having a waveform comprising a plurality of decay segments including at least one alternating current decay segment and at least one direct current decay segment.

* * * * *